June 23, 1970 — W. FIDI — 3,517,344
DELAY DEVICE PARTICULARLY FOR THE PRODUCTION
OF ARTIFICIAL REVERBERATION
Filed Dec. 6, 1966

INVENTOR
WERNER FIDI
BY
ATTORNEYS

United States Patent Office 3,517,344
Patented June 23, 1970

3,517,344
DELAY DEVICE PARTICULARLY FOR THE PRODUCTION OF ARTIFICIAL REVERBERATION
Werner Fidi, Baden, near Vienna, Austria, assignor to Akustische U. Kino-Gerate Gesellschaft mbH, Vienna, Austria
Filed Dec. 6, 1966, Ser. No. 599,596
Int. Cl. H03h 9/30
U.S. Cl. 333—30                                                                                                          4 Claims

ABSTRACT OF THE DISCLOSURE

A vibration or sound delay device includes a driving system for producing torsional vibration and a pick-up system responsive to the vibrations which are produced by the drive system. The construction includes two helical springs which are advantageously concentrically arranged and each includes an input and output end coupled between the driving and the pick-up system for transmitting the torsional vibrations from the driving system to the pick-up system. The system includes a large spring having a relatively long transmit time per convolution and a smallspring having a relatively short transmit time per convolution. In order to facilitate the transmission of a wider range of frequencies, the invention provides a connection between the springs of the system and the drive through an elastic coupling and suspending system.

SUMMARY OF THE INVENTION

In a helical spring, a change in mode from torsional to compressional vibration takes place when the wave length of the applied torsional vibration reaches the order of one convolution of a spring. Above this frequency, each convolution of the spring can no longer expand and contract as a whole but it is constrained to perform a much more complex vibrational motion which is opposed by much higher resistance so that the mode is changed. The lowest frequency at which this mode change is effected is referred to herein as a larger spring which has a longer transit time per convolution and a smaller spring which has a shorter transit time per convolution.

It has been found that rigidly coupled helical springs which are coupled to a common driving system and in which the torsional vibration is induced give rise in the larger spring to uncontrolled modes of vibration at frequencies above the mode-change limit of the large spring, and these uncontrolled modes of vibration cannot be used for transmission of signals and they have an adverse affect even on the wave form of the vibrations which are transmitted by the smaller spring.

In accordance with the invention, the above disadvantages are avoided, so that each spring can transmit without distortion the torsional vibration induced in it within the frequency range associated with such spring even though a common driving system and, if desired, a common pickup system are associated with both springs. According to the invention, this is accomplished by providing a torsionally elastic coupling and suspending system for the input end of the larger spring for suspending this input end and for connecting it to the driving system. In addition, a torsionally elastic coupling and suspending system may be provided for suspending the output end of the larger spring and for coupling the output end of the larger spring to the pickup system. With such an arrangement, the helical spring having the larger transit time per convolution is uncoupled from the helical spring having the lower transit time. This is accomplished by connecting the larger spring to the driving element by a torsionally elastic element or spring member. This torsionally elastic member is arranged to be located coaxially in respect to the larger spring. The construction is such that the larger spring and the torsionally elastic coupling and suspending system together constitute a filter having an upper frequency limit which is lower than the lowest frequency at which the larger spring transforms torsional vibration into compressional vibration.

In accordance with one feature of the invention, the torsionally elastic coupling and suspending system is symmetrically disposed between the springs on the side of the driving system and also on the side of the pickup system. The other spring is connected to the driving system and, if desired, with the pickup system by at least one torsionally elastic coupling and suspending system.

According to the invention, the torsionally elastic coupling and suspending system may comprise suitably deformed portions of the larger torsion spring. With torsion springs which are concentrically arranged one beside the other, a particularly simple and suitable design of such coupling and suspending system will be obtained by connecting that element of the driving system which induces the torsional vibration directly to an internally disposed smaller helical spring. The larger helical spring is provided with an end portion which is bent into a U-shaped configuration which extends in a plane containing the axis of the outer larger spring. It is connected to the wire suspension system at a spaced location from the driving system. Similar arrangements may be made in the input element of the pickup system and a bent U-shaped end portion of the spring which is to be directly driven is inserted in the grooves.

When the helical springs are arranged in a parallel arrangement, the directly driven spring is formed at its end with a U-shaped configuration which is connected to a straight end portion of the other spring.

When the helical springs are arranged in end-to-end relationship, an end portion of the larger spring is straightened and located on the axis of the spring. This end portion is firmly connected at its free end to the vibratory element of the driving or pickup system. A particularly suitable and favorable arrangement embodying this feature is characterized in that the driving system is disposed between the two springs and the larger spring is coupled to the driver by a torsionally elastic couplnig and suspending system. The smaller spring is rigidly coupled at one end to the driving system and is coupled at its opposite end to the pickup system.

Accordingly, it is an object of the invention to provide an arrangement of coil springs in a delay device particularly for producing artificial reverberation which insures satisfactory transmission of vibration.

A further object of the invention is provide a delay device which includes a plurality of springs of different sizes and wherein the larger springs are supported at least at the input connection by a torsionally elastic coupling and suspending system.

A further feature of the invention is to provide various preferred arrangements for the torsional suspension for a plurality of spring elements in a reverberation device in order to permit each spring to transmit without distortion the torsional vibration which is induced in it within the frequency range associated with even spring even though a common driving system or a common pickup system is associated with all of the springs.

A further object of the invention is to provide a delay device, particularly for producing artificial reverberation which is simple in design, rugged in construction and economical to manufacture.

The various features of novelty which characterize the invention are pointed out with particularity in the claims

BRIEF DESCRIPTION OF THE DRAWING VIEWS

DETAILED DESCRIPTION

Figure 1:
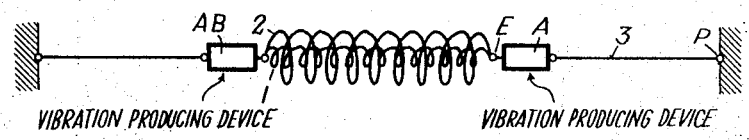
FIG. 1 is a schematic elevational view of an arrangement of two coil springs in a reverberation device constructed in accordance with the prior art.

The prior art is exemplified in FIG. 1, in which there is indicated a reverberation device comprising two helical springs 1 and 2 which are concentrically arranged one within the other and joined at their ends at E. An input or vibration producing device A is suspended at its one end from a fixed point P by means of a wire 3 and is connected at its opposite end to the juncture E. The vibratory output element A and the input device AB of the driving system are schematically indicated but they may be similar to the devices A and B shown in Pat. No. 3,402,371 to Weingartner et al. dated Sept. 17, 1968. The wire 3 constitutes either a pre-stressing or suspending wire. In a know arrangement, the vibration of the output element A is simultaneously transmitted to both springs 1 and 2 so that at frequencies above the mode-change limit of the larger spring 2 compressional vibration rather than torsional vibration will be induced in this spring 2. This compressional vibration has such an effect on the transmission properties that an exact transmission at frequencies above this mode-change limit is prevented both on the large spring 2 and the smaller spring 1.

It was found in coil springs excited in torsional vibrations, which are rigidly connected with each other and which have at least one common driving system, that uncontrollable vibration forms appear above the limiting frequency of the large spring, which are unsuitable for the transmission of signals and which also have an adverse effect on the form of the vibrations transmitted by the larger spring. This phenomenon is due to the fact that, for physical and geometric reasons, no torsional vibrations form anymore above the limiting frequency of a transit time element designed in the form of a coil spring, but only compression vibrations.

Figure 2:
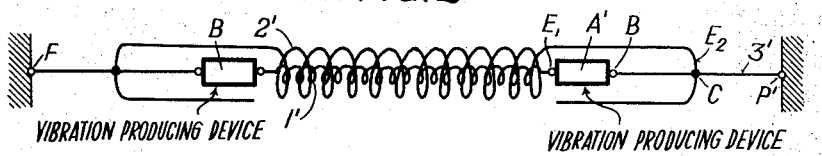
FIG. 2 is a somewhat schematic side elevational view of an arrangement of delay device for reverberation effects constructed in accordance with the invention.

In accordance with the present invention, the disadvantages of the prior art are overcome by the use of a torsionally elastic coupling and suspending system, suspending at least the input end of the larger spring and coupling the input end of the larger spring to the driving system. In the embodiment of FIG. 2, a smaller inner spring 1' is arranged concentrically within a large or outer spring 2'. The inner spring 1' has a smaller diameter and consequently a smaller transit time. The smaller spring 1' is directly connected at its one end E' to the output element A' which is suspended from the fixed point P' by a suspension wire 3'. The larger helical spring 2' is not directly connected to the driving system jointly with the smaller spring 1', but this connection is established by an elastic system. The elastic system is formed by a U-shaped portion 2a formed at the end of the large spring 2' which is fixed to the suspension wire 3' at the connecting point E2 at a location spaced from the end B of the driver A'. The U-shaped end E2 of the large spring 2' is soldered, welded or otherwise secured to the suspension wire at the location C. U-shaped end E2 includes a free end portion which extends alongside the driver A' in the drawing and which is required for balancing purposes. The torsional vibration of the output element A" is transmitted to the spring 2' by the portion BC of the suspension wire and of the end portion E2 of the spring 2'. The system comprising the length BC of the wire and the U-shaped portion E2 is referred to as a torsionally elastic coupling and suspending system and is dimensioned in such a manner that only vibration at a frequency below the mode-change limit of the larger spring is transmitted to that spring. In this way, all disturbances are eliminated which would occur if the entire vibration, including that at frequencies above the mode-change limit of the larger spring 2', were transmitted to the larger spring. As a result, the reverberation which is produced according to the invention gives a much more natural impression than has been obtained with the previously known arrangement. The vibration producing and/or receiving devices A' and B of each embodiment are similar to the devices shown and described in the Weingartner et al. Pat. No. 3,402,371 dated Sept. 17, 1968.

Figure 3:
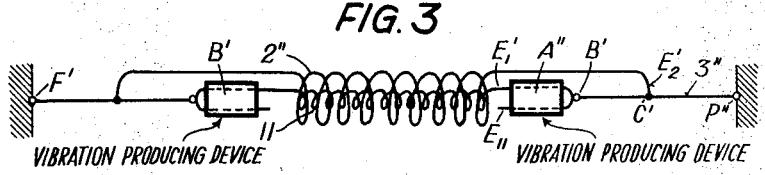
FIGS. 3 to 6 are views similar to FIG. 1 of other embodiments of the invention.

In the arrangement indicated in FIG. 3, the driving unit A" is provided wth a groove extendng along each side thereof to accommodate two leg portions of a U-shaped bent portion E11 of the smaller spring 11. The suspension wire 3''' is either connected between points P" and B' or it too may be arranged to include a forked end which includes straight leg portions which rest in the grooves of the input member A". The large spring 2" includes a bent end portion E2' which does not include a balancing free end leg.

Figure 4:
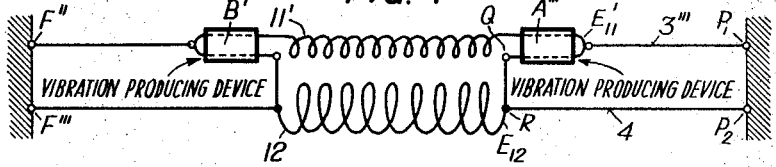

In the embodiment of FIG. 4, the invention is applied to a reverberation device in which the delay lines consist of helical springs arranged one beside the other. A smaller spring 11' is arranged alongside a larger spring 12 with their axes spaced and substantially parallel. The smaller spring 11' is provided with a U-shaped end portion E11' which is directly connected to the output element A''' of the driving system. The driving system A''' is suspended from the point P1 by a suspending wire 3'''. The larger spring 12 includes an end portion E12 which is bent so that it extends radially outwardly from the axis to the point Q at which it connects the U-shaped portion E11'. In this embodiment, the torsionally elastic coupling and suspending system comprises the wire portion QR and a separate suspension wire 4 for the larger helical spring 12. The suspension wire 4 is secured to the fixed support at the location P2 and is connected to the spring 12 at the location R.

In the embodiments which have been illustrated in FIGS. 2 to 4, a torsionally elastic coupling and suspending system is provided at the drive or input end. As indicated in the drawing, the pickup system B may also be elastically coupled to one or more helical springs, for instance, when special effects are desired. In the drawings, the pickup systems (B, B', B", AB and B''') are indicated as being connected to the associated springs in the same manner as the input system. In FIG. 2, the pickup B is connected at the opposite sides of the coil springs 1' and 2' to a suspension point F. A similar construction is provided for the pickup B' in respect to the fixed point F' and in respect to the pickup B" and the fixed points F" and F'''.

Figure 5:
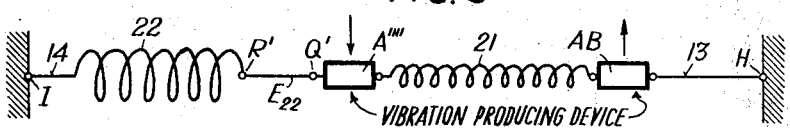

In the embodiment indicated in FIG. 5, there is shown a reverberation device to which the invention may be particularly easily applied. In this embodiment the helical springs are arranged end-to-end with their axes in substantial alignment. The entire arrangement is suspended from two fixed supporting points H and I by suspension wires 13 and 14, respectively. The output element A'''' of the driving system is disposed between the two helical springs, the larger spring 22 and the smaller spring 21. The end of the smaller spring 21 is directly connected to the outlet element A''''. The larger helical spring 22 is coupled to the output element A'''' by a torsionally elastic connection comprising a straight end portion E22 of the spring 22. The end portion E22 is bent to extend in the axis of the spring 22. In this embodiment, the torsionally elastic coupling and suspending system according to the invention is formed by the bent-open length E22 of the end portion of the spring 22, that is, by the portion between R' and Q'.

One end of the input element AB of the pickup system is directly connected to the other end of the smaller spring 21. The other end of the input element AB of the pickup system is connected by the suspension wire 13 to the fixed point H.

Figure 6:
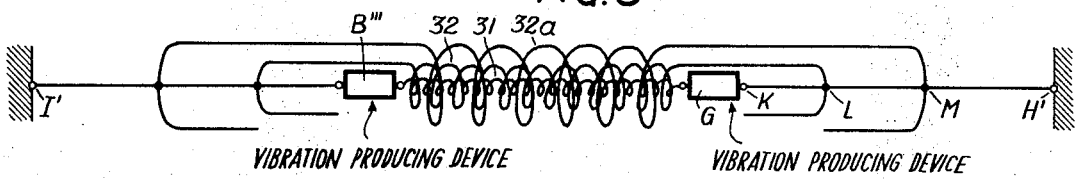

The invention may also be applied to arrangements using more than two helical springs where at least two of these springs have different dimensions so that their transit times per convolution are different. An arrangement with this possibility is shown in FIG. 6, which includes three helical springs 31, 32 and 32a arranged concentrically one within the other. Each side of the three springs are suspended from their associated supports and pickup or input elements in a similar manner. The wire portions KL and LM between the springs are so selected in length and diameter as to constitute suitable elastic coupling and suspending systems.

The dimensioning of the torsionally elastic coupling and suspending systems is not difficult because the geometric elements of the various elements comprising this system may be varied within wide limits. In this way, differences in materials can be compensated or taken into consideration. The bent-open end portion of this large spring may be replaced by a coupling element which is made of a different material, including a plastic material or any material which is particularly suitable for the desired objects.

The dimensions of the elastic coupling and suspending system for a given delay device may be determined by trial and error. The upper frequency limit of the filter consisting of the larger spring and the elastic coupling and suspending system will be increased if the torsionally elastic member contained in the system and disposed in the axis of the larger spring is increased in diameter and/or reduced in length. The frequency will be reduced if the member is reduced in diameter and/or increased in length. In this way, the dimensions of the elastic coupling and the suspending system can be selected so that the upper frequency limit of the filter is below the mode-change limit of the spring having the longer transit time per convolution.

While specific embodiments of the invention have been shown and described in detail to illustrate the application of the inventive principles, it will be understood that the invention may be embodied otherwise without departing from such principles.

What is claimed is:

1. A delay device which comprises a driving system operable to produce torsional vibration, a pickup system responsive to torsional vibration, at least two helical springs having input and output ends and coupled between said driving and pickup systems to transmit torsional vibration from said driving system to said pickup system, said springs comprising a larger spring having a relatively long transit time per convolution and a smaller spring having a relatively short transit time per convolution, and a torsionally elastic coupling and suspending system suspending the input end of said larger spring and coupling said input end of said larger spring to said driving system, said smaller spring extending into said larger spring, said driving system having an output element directly connected to said input end of said smaller spring, said larger spring having a U-shaped portion comprising its input end, a suspending wire carrying said output element, and said input end of said larger spring being connected to said wire at a distance from said output element.

2. A delay device which comprises a driving system operable to produce torsional vibration, a pickup system responsive to torsional vibration, at least two helical springs having input and output ends and coupled between said driving and pickup systems to transmit torsional vibration from said driving system to said pickup system, said springs comprising a larger spring having a relatively long transit time per convolution and a smaller spring having a relatively short transit time per convolution, and a torsionally elastic coupling and suspending system suspending the input end of said larger spring and coupling said input end of said larger spring to said driving system, said springs extending one beside the other with parallel axes, said smaller spring having a U-shaped portion comprising its input end, said driving element having an output element embraced by said U-shaped portion of said smaller spring, said larger spring having an end portion which comprises its input end and which extends to the axis of said larger spring and then radially outwardly, and said input ends of both said springs being firmly connected to each other.

3. A delay device which comprises a driving system operable to produce torsional vibration, a pickup system responsive to torsional vibration, at least two helical springs having input and output ends and coupled between said driving and pickup systems to transmit torsional vibration from said driving system to said pickup system, said springs comprising a larger spring having a relatively long transit time per convolution and a smaller spring having a relatively short transit time per convolution, and a torsionally elastic coupling and suspending system suspending the input end of said larger spring and coupling said input end of said larger spring to said driving system, said larger spring and said coupling and suspending system together constituting a filter having an upper frequency limit which is lower than the lowest frequency at which said spring transforms torsional vibration into compressional vibration.

4. A delay device comprising a small coil spring, a large coil spring adjacent said small coil spring, a vibration producing element connected to said small coil spring, a fixed support, a suspension member connected to said fixed support and to said vibration producing element, and a torsionally elastic coupling connecting said large spring to said vibration producing element and said suspension member, said torsionally elastic coupling comprising a substantially U-shaped end portion of said large coil spring connected to said suspension member and having a free leg portion extending alongside said suspension wire.

References Cited

UNITED STATES PATENTS

| | | | |
|---|---|---|---|
| 3,402,371 | 9/1968 | Weingartner | 333—71 |
| 3,199,053 | 8/1965 | Bunger | 333—30 |
| 3,136,853 | 6/1964 | Bissonette | 333—30 |
| 3,092,792 | 6/1963 | Daniel | 333—30 |
| 3,159,713 | 12/1964 | Laube | 179—1.6 |
| 3,189,686 | 6/1965 | Brombaugh | 179—1 |

HERMAN K. SAALBACH, Primary Examiner

C. BARAFF, Assistant Examiner

U.S. Cl. X.R.

333—71; 179—1; 84—1.26